United States Patent [19]

Fritsch

[11] Patent Number: 4,761,700

[45] Date of Patent: Aug. 2, 1988

[54] VIDEO CLEANING DEVICE

[75] Inventor: Joseph F. Fritsch, Dublin, Ireland

[73] Assignee: Roxanne Y. Fritsch, Dublin, Ireland; a part interest

[21] Appl. No.: 887,854

[22] Filed: Jul. 22, 1986

[30] Foreign Application Priority Data

Jul. 26, 1985 [IE] Ireland ............... 1877/85

[51] Int. Cl.$^4$ .................................. G11B 5/41
[52] U.S. Cl. .................................. 360/128; 360/95; 360/137
[58] Field of Search ............... 360/128, 84, 85, 95

[56] References Cited

U.S. PATENT DOCUMENTS

| 4,462,056 | 7/1984 | Kara | 360/128 |
| 4,580,185 | 4/1986 | Clausen et al. | 360/128 |
| 4,616,283 | 10/1986 | Clausen et al. | 360/128 |
| 4,635,154 | 1/1988 | Allsop et al. | 360/128 |

FOREIGN PATENT DOCUMENTS

| 0156568 | 2/1985 | European Pat. Off. | 360/128 |
| 59-63020 | 4/1984 | Japan | 360/128 |

Primary Examiner—John H. Wolff
Attorney, Agent, or Firm—Sughrue, Mion, Zinn, Macpeak and Seas

[57] ABSTRACT

A device for cleaning the components in the cassette receiving area of a video playing/recording unit comprises a housing having a cleaning tape 26 wound about a pair of spools 24, 25. A carrier member 28 pivotal in the housing carries a brush 29 for cleaning engagement with a drum 2 in the video unit. The cleaning tape extends behind a bearing member 42 of the carrier member and as the cleaning tape is moved into cleaning engagement with the drum of the video unit the carrier member, and in turn the brush are moved outwardly of the housing and the brush engages the drum of the video unit.

16 Claims, 3 Drawing Sheets

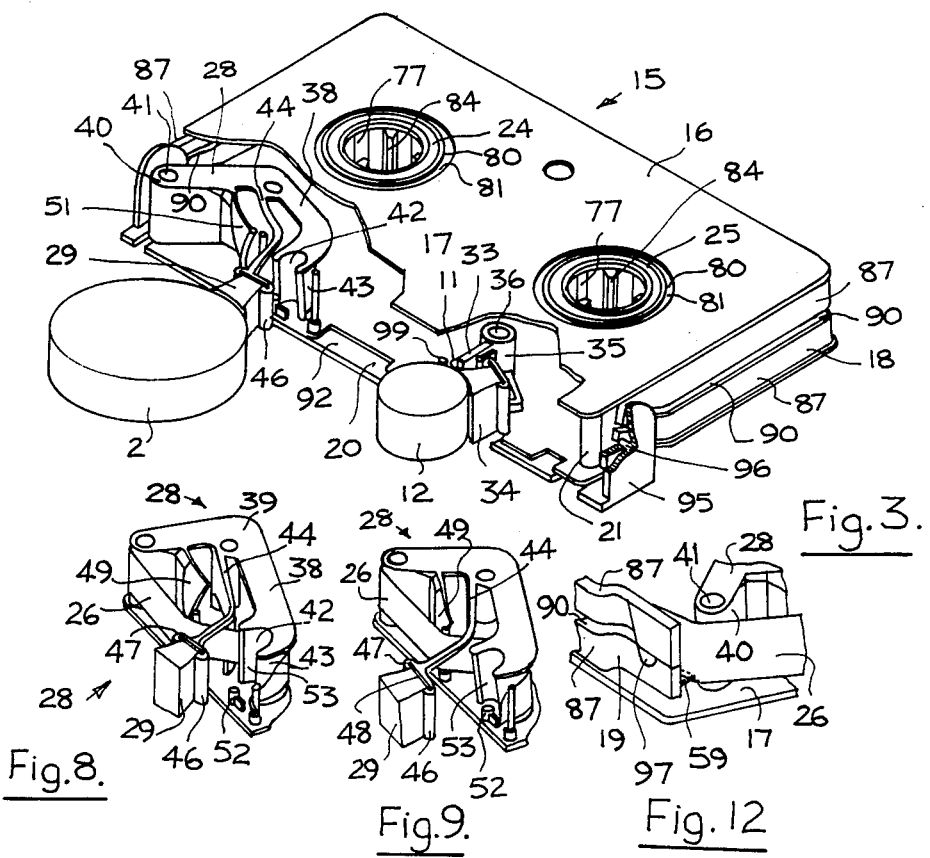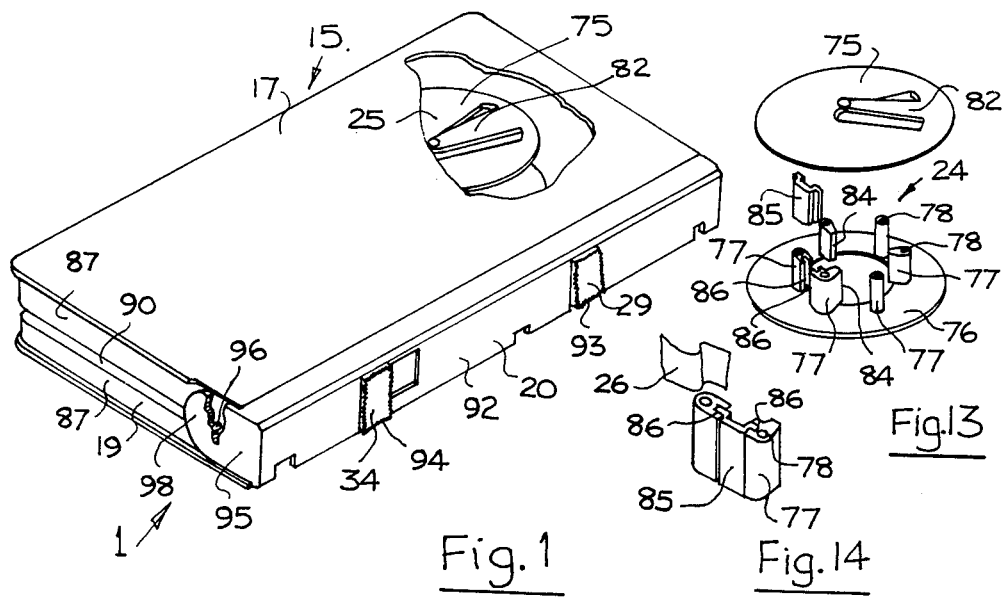

VIDEO CLEANING DEVICE

BACKGROUND TO THE INVENTION

1. Field of the Invention

The present invention relates to a cleaning device for cleaning the operating components of a playing and/or recording video unit.

Such video units may be either used for playing from and/or recording onto a tape in a cassette. The video unit in general has a receiving area for a video tape cassette. A rotating drum with a recording/playback video head hereinafter referred to as a recording head is mounted in the receiving area over which the tape is passed and which either scans from the tape or records onto the tape. Guide means, usually rollers on pivotal arms, are provided in the cassette receiving area to move the tape outwardly from the cassette towards and partly around the drum. In general, a capstan and pinch roller arrangement is provided which controls the tape speed onto or from a spool in a cassette which is driven by a corresponding spindle in the video unit. Sound and erase heads are also provided in the tape path. The problem with such video units is that in general the drum and recording video head, guide means, capstan and pinch roller, and other components in the tape path, usually collect dirt deposits. This may be dust, particles from the tapes or any other undesirable foreign matter. Once the build-up of dirt exceeds certain limits, the video unit fails to function effectively. One of the major problems with dirt collecting on the capstan and pinch roller is that this dirt can effect tracking and playing speed of the video tape. Furthermore, this dirt can readily easily be transferred by the tape onto the sound and video heads, thereby affecting sound and picture quality, and can damage the tape. It is therefore essential that all components in the tape path are kept as free of any dirt deposits as possible.

2. Discussion of the Prior Art

Cleaning devices to achieve this are known. However, such devices have been found in the past to suffer from various disadvantages. In general, these known devices comprise a cassette housing which is substantially similar to a video tape cassette, but instead of having a magnetic tape wound onto the spools, a cleaning tape is provided. The cassette is placed in the receiving area of the video unit, and functions as an ordinary video tape cassette, with the exception that as the cleaning tape is drawn across the components in the tape path the action of the tape on the components cleans the components. The cleaning action is further assisted by applying a cleaning solution to the tape.

By virtue of the fact that the cleaning tape is of similar width to a magnetic video tape only the area of the components in contact with a normal magnetic video tape is cleaned. Thus, any dirt deposits outside these areas are not removed. This is a particularly major problem in that most dirt deposits build up on the components in the tape path on either side of the path along which the tape passes. These deposits eventually enter the path of the tape, and are carried along and deposited on the video and sound head and other components. The fact that most dirt deposits accumulate on each side of the tape path is caused by the action of the video tape constantly passing over the components, and this tends to keep the tape path relatively clean. However, dirt tends to be squeezed out by the tape and collects as a deposit on each side of the tape path. This is a particular problem on the drum. As this dirt deposit accumulates, in general, bits of dirt become detached and fall into the tape path, and are thus carried along and deposited, usually on either the video head or the sound head. This immediately either reduces considerably the efficiency with which the video can operate, or in many cases causes major distortion in both the picture and sound of the device.

Thus, because known cleaning devices clean by the action of a cleaning tape passing over the components, and since the cleaning tape only cleans the tape path of a normal video magnetic tape, known cleaning devices are incapable of removing dirt deposits which build up on the components and in particular the drum, on either side of the tape path. Furthermore, in certain cases it has been found that because of incorrect tension in the cleaning tape, the tape may bear lightly on part of the dirt build-up adjacent the tape path. It has been found that this action is not sufficient to remove such dirt, but in many cases may loosen it sufficiently that the loosened dirt may subsequently fall into the tape path when a video tape is being played. In fact, it has been found on many occasions that shortly after cleaning with known cleaning devices, dirt deposits fall into the tape path and these may be deposited on the sound or video heads.

A further problem with known cleaning devices is that by virtue of the fact that the cleaning tape is usually of a textile material, the frictional drag over the components and in particular over the drum is greater than the frictional drag between a normal magnetic video tape and the drum. This leads to excess loading on the drive mechanism, and in particular the electric motor or motors driving the various components. In certain cases it has been known for electric motors to burn out while the video unit was being cleaned with a tape type cassette cleaning device. In fact, this problem may even be amplified when a liquid cleaning solution is sprayed onto the tape, since in general, it has been found that the cleaning solution tends to further increase the friction drag between the cleaning tape and the drum.

A further problem with the known tape type cassette cleaning devices is that by virtue of the fact that the cleaning is carried out by the action of a cleaning tape passing over the components, only the surfaces in contact with the tape are cleaned. For example, in many cases grooves are formed in the outer periphery of the drum, and it is impossible for the cleaning tape to clean such grooves.

There is therefore a need for a cleaning device which cleans the components, and in particular the drum in which the video heads are mounted more efficiently than cleaning devices known heretofore.

OBJECTS OF THE INVENTION

One object of the invention is to provide a cleaning device for a video unit which adequately cleans at least the drum. A particular object of the invention is to provide a cleaning device which cleans not only the tape path of the drum, but also the portions of the drum on either side of the tape path. It is also an object of the invention to provide a cleaning device which cleans areas on the drum which are not touched by the tape, for example, grooves and the like in the drum. A further object of the invention is to provide a cleaning device in which the frictional drag between the cleaning tape and the components in the video unit, and/or any other cleaning means in the cleaning device and the components in the video unit is kept to a minimum.

SUMMARY OF THE INVENTION

According to the invention, there is provided a cleaning device for cleaning the operating components of a playing and/or recording video unit, where the video unit comprises a receiving area for receiving a video tape cassette, a recording head mounted in a rotating drum in the cassette receiving area for recording onto or playing from the tape, guide means to engage the tape of a tape cassette for moving the tape outwardly of the cassette to the drum, and a capstan and pinch roller assembly in the receiving area to engage the tape as it passes onto or from a spool of the cassette, the cleaning device comprising a base member to engage the cassette receiving area, a carrier member mounted on the base member and cleaning means mounted on the carrier member to at least clean the drum.

In one embodiment of the invention, the carrier member is movable from a position with the cleaning means being spaced apart from the recording drum to a cleaning position, with the cleaning means in cleaning engagement with the recording drum.

In another embodiment of the invention, a cleaning tape wound on a pair of spools, rotatable in the base, and in use operably engageable with drive spindles of the video unit is provided, the cleaning tape being in engagement with the carrier member, so that on outward movement of the tape to engage the drum, the carrier member is moved outwardly to move the cleaning means into cleaning engagement with the recording drum.

Preferably, the carrier member is pivotally mounted on the base member, and comprises a bearing member to slidably engage the cleaning tape.

Advantageously, the cleaning means is mounted on a flexible arm extending from the carrier member.

In another embodiment of the invention, the carrier member is positioned in the base member so that, in use, the bearing member is spaced apart from the drum and intermediate the guide means on each side of the drum, so that the cleaning tape, in use, on passing over one guide means passes over a first arcuate portion of the drum and then passes over the bearing member before passing over a second arcuate portion of the drum on the opposite side of the drum to the first arcuate portion.

In another embodiment of the invention, a portion of the carrier member is adapted to engage a guide roller of the video unit, so that on return of the tape to the cleaning device, the carrier member is moved inwardly of the base, the said portion of the carrier member being bevelled to prevent the said guide roller engaging behind the carrier member should the carrier member be outwardly disposed of the base during loading of the cleaning device into the video unit.

In another embodiment of the invention a top member spaced apart from the base member is provided, the carrier member being mounted between the top and bottom members, and a stop means being provided on the top member to engage the bearing member to limit outward movement of the top thereof.

In another embodiment of the invention, the cleaning means is provided by a brush member.

In a further embodiment of the invention, a cleaning member is mounted on the base member to clean the capstan and pinch rollers in use, the cleaning member being outwardly directed from the base member, and positioned so that, in use, as a guide means of the video unit is pivoted to move the tape outwardly of the cleaning device, the guide means wipes across the cleaning member with cleaning engagement.

Additionally, the invention provides a cleaning device for cleaning a pair of spools rotatable in the base member and, in use, operably engagable with spindles on the video unit, a cleaning tape wound on the spools, and a bearing member mounted on the base member which, in use, is spaced apart from the drum and intermediate the guide means on each side of the drum, so that, in use, the cleaning tape on passing over one guide means passes over a first arcuate portion of the drum, and then passes over the bearing member, before passing over a second arcuate portion of the drum on the opposite side of the drum to the first arcuate portion.

ADVANTAGES OF THE INVENTION

The advantages of the invention are many, however, one of the important advantages is that by virtue of the fact a cleaning means is provided which is movable into and out of the housing, the width of the cleaning means can be greater than the tape path. Thus, when the cleaning means bears on the drum, virtually the full width of the drum is cleaned, and any accumulation of dirt which accumulated on each side of the tape path is cleaned. A further advantage is achieved when the cleaning means is provided by a brush, the fact that the brush bristles are relatively flexible permits the bristles to flex on coming in contact with the drum, and thus the bristles fan out to extend to clean even a wider area of the drum than the actual width of the brush base. Furthermore, where the cleaning means is provided by a brush, a further advantage is achieved in that the brush bristles are capable of cleaning within any grooves or other relatively concealed areas within the drum, which cleaning tapes known heretofore cannot have access to. Indeed, it has been found that the use of a brush also improves the cleaning of the video head or heads in the drum.

A further important advantage of the invention is that by virtue of the fact that the tape passes around the carrier member and is thus removed from portion of the drum, in other words, the tape only touches two relatively short arcuate portions of the drum on either side of the drum, the frictional drag between the tape and the drum is considerably reduced. This, of course, it will be appreciated has the advantage that it avoids any danger of the motors in the video unit being slowed down or stopped with the consequent danger of a motor burning out. Futhermore, any risk of damage to clutches in the transmission system of the video unit is also substantially reduced, and in most cases, eliminated. Thus, the cleaning device according to the present invention can be used with relatively low powered video units.

The advantage of having the cleaning means mounted on a movable carrier member is that it permits the video unit to be loaded into and removed from the video unit without any difficulty. Furthermore, where the brush is mounted on a relatively flexible arm of the carrier member, backward movement of the brush relative to the drum is permitted, thereby avoiding any danger of excessive pressure between the brush and the drum, which could lead to increased frictional drag. A further advantage of the invention is that by virtue of the fact that the carrier member is provided with a bevelled portion, there is no danger of any of the guide rollers of the video unit engaging behind the carrier member which could present difficulties in use. A further advantage of the invention is that by virtue of the construction of the device, a relatively easily assembled, constructed and manufactured cleaning device is provided. Similarly, a relatively inexpensive cleaning device is also provided.

These and other advantages and objects of the invention will be readily apparent from the following description of a preferred embodiment thereof, given by way of example only with reference to the accompanying drawings.

BRIEF DESCRIPTION OF THE DRAWINGS

FIG. 1 is a perspective view of a cleaning device according to the invention for cleaning the components in the cassette receiving area of a video unit, FIG. 3 is a partly cut-away upside down perspective view of the cleaning device of FIG. 1, FIG. 8 is a perspective view of a detail of the cleaning device of FIG. 1, FIG. 9 is a further perspective view of the detail of FIG. 8, FIG. 12 is a perspective view of a portion of the cleaning device of FIG. 1, FIG. 13 is an exploded view of a further detail of the cleaning device of FIG. 1, and FIG. 14 is an enlarged view of portion of the detail of FIG. 13.

DETAILED DESCRIPTION OF THE INVENTION

Figure 5:
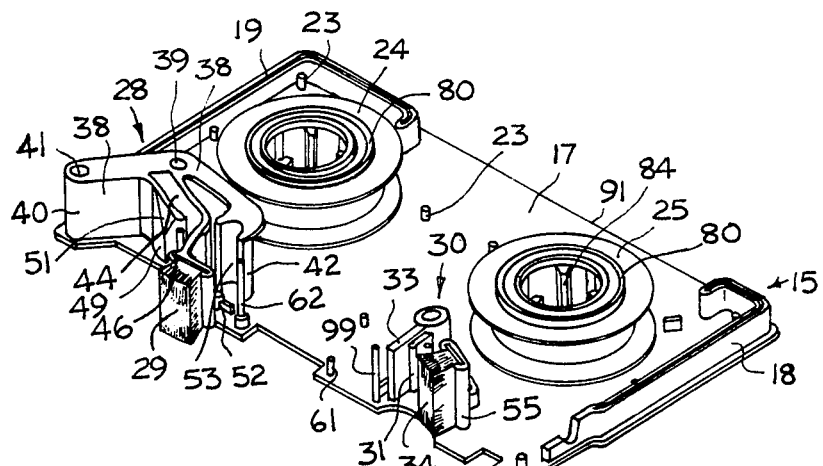
FIG. 5 is an upside down perspective view of the cleaning device of FIG. 1 with the base removed.
Figure 4:
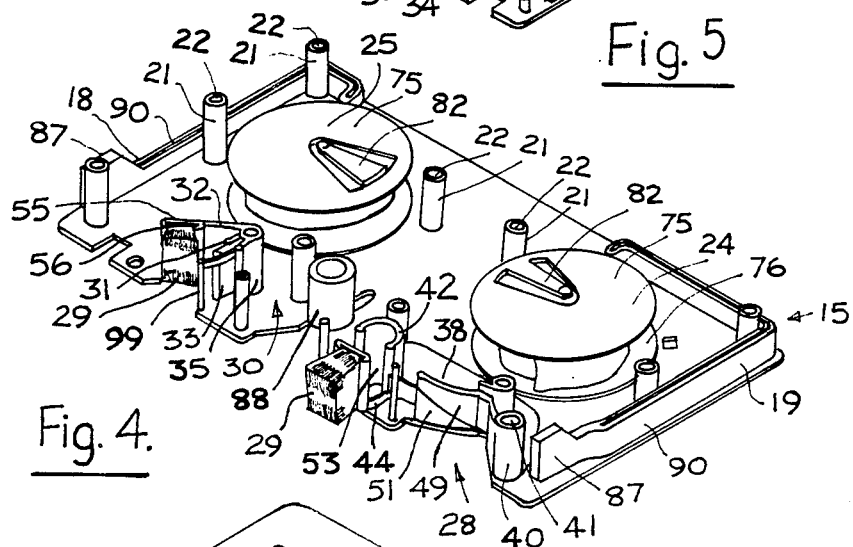
FIG. 4 is a perspective view of the cleaning device of FIG. 1 with the top portion removed.
Figure 2:
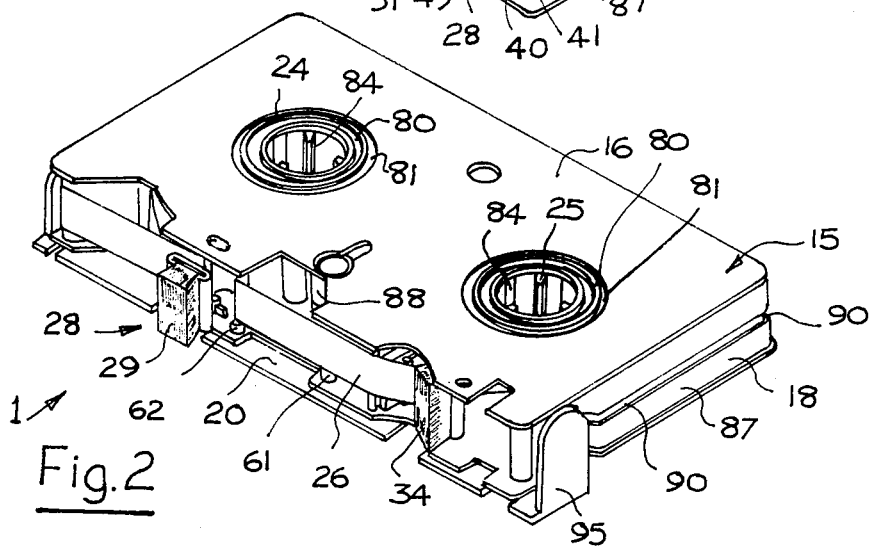
FIG. 2 is an upside down perspective view of the cleaning device of FIG. 1.

Referring to the drawings, there is provided a cleaning device according to the invention, indicated generally by the reference numeral 1, for cleaning the operating components of a playing and/or recording video unit. Before describing the cleaning device 1, the operating components of the video unit will be described.

Figure 6:
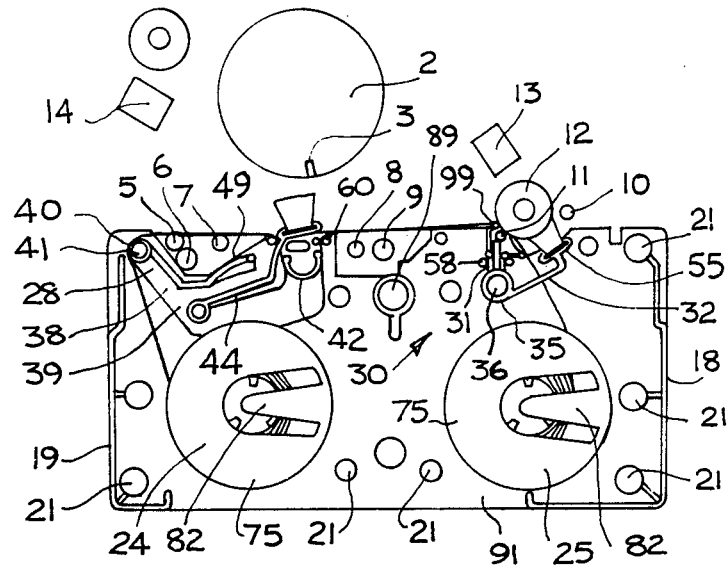
FIG. 6 is a plan view of the cleaning device of FIG. 1 with the top removed, illustrated in position with the components, which are diagrammatically represented, which would be in the cassette receiving area of a normal video unit.
Figure 7:
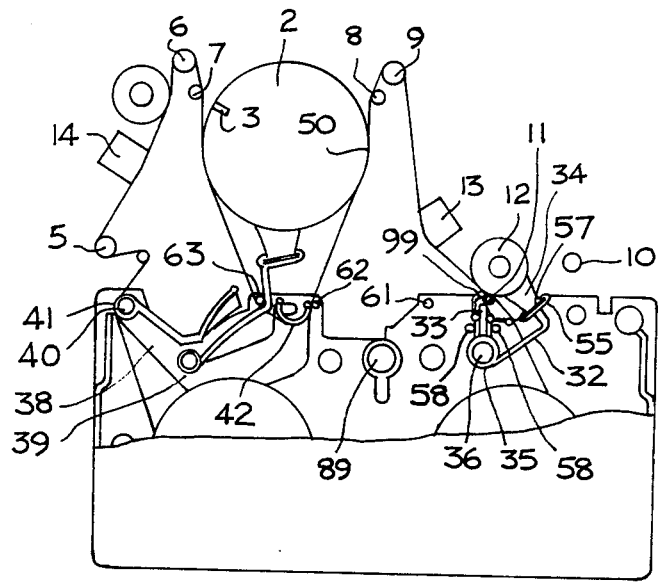
FIG. 7 is a plan view similar to FIG. 6 with the cleaning device in use.
Figures 10, 11:
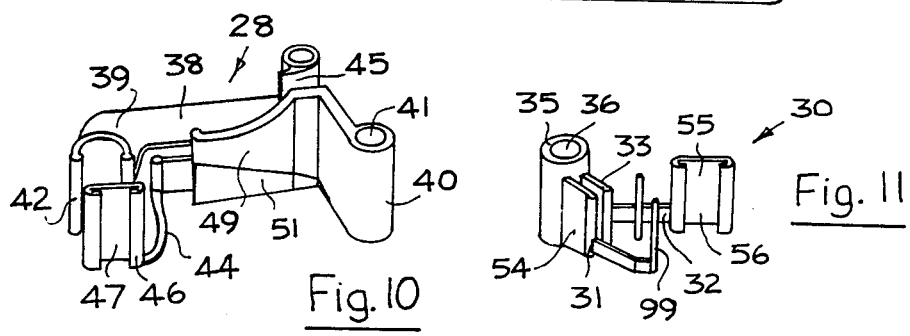
FIG. 10 is a further perspective view of the detail of FIG. 8.
FIG. 11 is a perspective view of another detail of the cleaning device of FIG. 1.

The video unit comprises a video tape cassette receiving area in which the operating components are mounted. For simplicity only the relevant components in the receiving area are illustrated in FIGS. 6 and 7. FIG. 6 illustrates the cleaning device 1 having been just loaded into the receiving area while FIG. 7 illustrates the device actually in cleaning operation. The components in the receiving area include a recording drum 2 which in use the tape is moved out towards and passes partly around. One or more video heads 3 are mounted in the recording drum adjacent the periphery thereof. Guide rollers, 5, 6, 7, 8 and 9 to move the tape out of the cassette are also provided, these are mounted on pivotal arms (not shown). A further guide roller 10 is also provided. Prior to playing of the tape, the guide rollers, 5, 6, 7, 8 and 9 as illustrated in FIG. 6 locate behind the tape in the cassette. On activation of the play button (not shown) the guide rollers 5, 6, 7, 8 and 9 are pivoted outwardly to the position of FIG. 7 to move the tape to the drum. A capstan 11 and pinch roller 12 are also mounted in the receiving area, as are a sound recording head 13 and an erase head 14.

The operation of these components will be readily know to those skilled in the art, and it is not intended to describe them further.

The cleaning device 1 comprises a housing 15 formed by a base member 16, a top member 17, side walls 18 and 19 and a lid 20, pivotal on the side members 18 and 19, all of injection moulded plastics material. The base member 16 and the top member 17 are joined by posts 21 with sockets 22 and which are integrally moulded with the base member 16. Plugs 23 integrally injection moulded with the top member 17 engage the sockets 22 with snap fit action. A pair of spools 24 and 25 onto which a cleaning tape 26 of fabric material is wound are rotatably mounted in the housing 15 for driving engagement with spindles (not shown) in the cassette receiving area of the video unit. This is described in more detail below. A carrier member 28 which carries a cleaning means, in this case a brush 29 is pivotal in the housing 15 and is movable by the action of the tape 26 on the carrier member 28 as will be described below, from a position within the housing 15 to a cleaning position with the brush 29 abutting the drum 2 for cleaning the drum and video head 3, see FIG. 7. Cleaning means to clean the capstan and pinch roller 11 and 12 respectively are provided by a cleaning mechanism 30 with arms 31 and 32 which respectively support a felt cleaning member 33 and a brush 34. The arms 31 and 32 are integrally injection moulded with a sleeve 35 which pivotally engages pins 36 extending between the top and bottom members 16 and 17 respectively.

The carrier member 28 comprises a main arm 38 cranked at 39 and extending from a pivot sleeve 40, which is pivotal on a post 41 extending between the base and top members 16 and 17 respectively. A bearing member 42 is mounted at the other end of the main arm 38 and forms a bearing surface 43 over which the cleaning tape 26 passes to move the carrier member 28 outwardly towards the drum 2. This can be seen in FIGS. 6 and 7. A flexible arm 44 extends from a mounting post 45 on the main arm 38 an carries a housing 46 with a grooved recess 47 to slidably engage a base 48 of the brush 29. Thus the brush 29 may be replaced by sliding it from the recess 47. A return arm 49 extends from the main arm 38 to engage the guide roller 7 as the cleaning tape 26 is being returned to the housing 15. The action of the guide roller 7 on the return arm 49 pivots the carrier member 28 into the housing to return the brush 29 from the drum 2. A bevelled portion 51 is provided on the return arm 49, so that if for any reason the carrier member 28 is projecting outwardly from the housing 15 as the cleaning device 1 is being loaded into the cassette receiving area, as the device 1 bears down on the guide roller 7, the roller 7 engages the bevelled portion 51 thus returning the carrier member into the housing 15. This avoids any danger of the guide roller 7 engaging behind the return arm 49.

The carrier member 28 is of plastics material injection moulded in one piece. The main arm 38 and the return arm 48 are of sufficiently thick cross-section to be substantially rigid, while the flexible arm 44 is of sufficiently thin cross-section to provide a considerable degree of flexibility in the arm.

Thus, in use, as the guides rollers 5 to 9 move the cleaning tape 26 outwardly around substantially opposing portions 50 of the drum 2, the action of the tape 26 on the bearing member 42 pivots the carrier member outwardly, so that the brush 29 bears on the drum 2, see FIG. 7. The flexibility provided in the flexible arm 44 is such that it permits the arm to flex backwardly against the forward motion of the carrier member, which is induced by the tension in the cleaning tape 26, and in practice, it has been found that the flexible arm 44 should be sufficiently flexible to flex against the forward motion induced by the tape tension.

A stop means, in this case a spud 52, is provided on the top member 17 to limit the outward movement of the carrier member 28. The spud 52 engages the forward face 53 of the bearing member 42, see FIGS. 5, 8 and 9. It has been found in practice that the action of the bearing member 42 on the spud 52 causes the lower end of the bearing member 42 to kick outwardly under the tension in the cleaning tape 26. This thus tends to slightly incline the bearing member 42, in use, thereby causing the cleaning tape 26 to pass over the bearing member 42 towards its lower end rather than its upper end. This, in turn, keeps the cleaning tape 26 down relative to the cleaning device 1, and the action of this assists in ensuring that the cleaning 26 tape remains adequately tracking on the drum 2. It has been found in devices known heretofore that in many cases the cleaning tape tends to ride upwardly on the drum and eventually disengages the drum. A spud 59 is provided on the side wall 18 against which the cleaning tape bears on exiting from the housing 15. This also further assists in keeping the tape 26 downward relative to the housing 15. A further spud 60 is provided on the base member 16, and also engages the cleaning tape to ensure that the tape doesn't exit from too low a position in the housing 15.

Returning now to the cleaning mechanism 30 for the capstan and pinch roller 11 and 12 repsectively, the cleaning mechanism 30 is of plastics material injecton moulded in one piece. The cleaning felt 33 is releasably engaged between the arms 31 and inwardly directed ridges 54 on the ends of the arms 31 retain the cleaning felt 33 in position. A housing 55 is provided on the end of the arm 32 and a recess 56 in the housing 53 slidably and releasably engages a base 57 of the brush 34. The cross-section of the arm 32 is such as to provide a limited degree of flexibility to enable the brush 34 to bear on the pinch roller 12 without damage. The cleaning felt 33 acts on the capstan 11 as it is rotated to clean it while the brush 34 acts on the pinch roller 12 while it is rotating for cleaning thereof. The brush 34 is also positioned, so that as the guide roller 10 moves outwardly, it passes over the brush 34 and is cleaned. A pair of spuds 58 on the base member 16 are provided on either side of the arms 31 to limit the pivotal movement of the cleaning mechanism 30. A pin 99 in front of the felt 33 guides the tape 26.

As can be seen in FIGS. 6 and 7 the cleaning tape 26 passes between the cleaning felt 33 and the brush 34. Posts 61, 62 and 63 are provided along the front face of the housing 15 to act as guide posts for the cleaning tape 26. The sleeve 40 of the carrier member 28 also acts as a guide for the tape 26.

Each spool 24 and 25 is of injection moulded plastics material, and comprises a top disc 75 and a lower disc 76 joined by a plurality of posts 77 with sockets 78 extending from the lower disc 76. Plugs (not shown) on the top disc 75 engage the sockets 78 to join the two discs 75 and 76 with snap fit action. A circumferential flange 80 extends from the lower disc 76 of each spool 24 and 25. Each flange 80 rotatably engages a corresponding opening 81 in the base member 16. A flexible tongue 82 formed in the top disc 75 abuts the top member 17 to bias spools 24 and 25 towards the base member 16. Three inwardly directed ribs 84 extend from three of the posts 77 to operably engage the drive spindles (not shown) in the cassette receiving area. The cleaning tape 26 is secured to each spool by means of a securing member 85 which engages the cleaning tape between a pair of opposing grooves 86 in a pair of adjacent posts 77.

A tubular member 88 with an opening 89 through the base member 16 is provided to, in use, shroud a light source for controlling the operation of a normal tape cassette. The tubular member 88 is integrally moulded with the base member 16 and is either of opaque plastics material or is made opaque.

The side walls 18 and 19, as can be seen, are integrally moulded in two halves 87 with the base member 16 and top member 17. However, the two halves 87 do not abut each other, and as can be seen form a gap 90. This permits air to circulate through the housing 15 to dry off the cleaning tape 26 after use.

The side walls 18 and 19 terminate at the rear of the housing 15 and leave a portion 91 open, which further facilitates air circulation. It also permits a cleaning fluid to be applied to the tape on the spool 24. This is described below.

The lid 20 comprises a front portion 92 with a pair of openings 93 and 94 to respectively accommodate the brushes 29 and 34, and the felt 33. Side members 95 extend rearwardly from the front member 92 and a pivot pin at 96 extending from the side members 95 engage a corresponding pivot hole 97 in the side walls 18 and 19. The pivot pins 96 are offset from the central line of the side members 95, thus, as the lid pivots upwardly to its in use position, the rear portion 98 of the side members 95 pivots downwardly to extend down to the base member 16. Thus, once the side members 95 are of an opaque material, they will act to block out any light which would have been received by a photosensor (not shown) which is mounted in certain video units to detect the end of play of a video tape. Thus, by blocking the light from such a photosensor, the video unit will continue to play to move the cleaning tape through the tape path to clean the components of the receiving area of the video unit.

In use, a suitable cleaning solution is applied to the exposed portions of the cleaning tape along the front of the housing 15. This is done by raising the lid 20. Cleaning solution is also applied to the accessible portion of the tape around the spool 24 by gaining access through the opening 91 in the rear of the housing 15, and cleaning fluid is applied to the brushes 29 and 34 and to the felt 33. The cleaning fluid may be applied by any suitable means, however, it has been found that to apply the cleaning fluid from a felt type wick dispenser, the delivery of fluid can readily easily be controlled. Such a dispenser would, in general, look like a felt pen, and the cleaning fluid would be dispensed through the felt wick onto the tape on stroking the felt wick across the cleaning tape 26. The cleaning device 1 is then entered in the video unit as a conventional video cassette would be. On activating the play button (not shown) of the video unit, the guide rollers 5 to 10 move outwardly as illustrated in FIG. 7, thereby bringing the cleaning tape into contact with the components to be cleaned, namely the recording drum 2, the sound recording and playing heads 13 and 14, the capstan and pinch roller 11 and 12 and any other components which would normally be in the tape path. As the cleaning tape 26 is moved into the position of FIG. 7, the carrier member 28, and in turn the brush member 29 are moved outwardly of the housing, so that the brush 29 engages the recording drum and in turn the recording heads 3 in the drum. The spindles (not shown) in the video unit then drive the spools 24 and 25 and the tape is drawn through the tape path, thereby cleaning the components. As the recording drum rotates the action of the brush 29 bearing on the drum cleans both the drum and the recording heads. The capstan and pinch roller as well as being cleaned by the tape, are also cleaned by the felt member 33 and brush 34 respectively. As already mentioned, as the guide roller 10 moves outwardly across the brush 34, it is also cleaned.

When the cleaning cycle has been completed, the video unit is switched off by control means (not shown or described) in the video unit. However, such control means will be well known to those skilled in the art. The guide rollers 5 to 10 then return to their rest position, and the cleaning tape is returned to the housing 15. The guide roller 7 on return bears on the return arm 49 and returns the carrier member 28 and in turn the brush 29 into the housing 15. The device is then removed from the video unit, and the video unit is ready for use, the operating components having been cleaned.

It can clearly be seen from FIG. 7 that as the guide rollers 7 and 8 move the tape outwardly to engage the drum, the cleaning tape only bears on two opposite arcuate portions 50 of the drum. The bearing member 42 of the carrier member 28 retains the tape from the drum over the area between the portions 50. This has a considerable advantage in that by virtue of the fact that the cleaning tape only bears on the two relatively small arcuate portions 50 of the drum, the actual surface area of the cleaning tape engaging the drum is relatively low. This thus reduces frictional drag between the tape and the drum, while at the same time, it does not in any way affect the cleaning action, since as the drum rotates it is cleaned as it passes over the tape at the portions 50. Furthermore, as already described, the cleaning brush 29 further ensures thorough cleaning of the drum 2, and the recording head 3. By reducing the frictional drag on the drum, which has been a problem in cleaning devices known heretofore, considerably less power is required to drive both the drum and the tape. Thus, the cleaning device can be used in video units which have relatively low power output motors without any danger of it jamming, running at a lower speed than designed, with the consequent danger of the motor burning out and indeed the entire video unit going on fire.

The video unit according to the present invention has many advantages, one of them being the advantage that the device is suitable for use in low powered video units as just discussed. Perhaps the most important advantage is that by virtue of the fact that the brush 29 is provided, thorough cleaning of the drum and the recording heads in the drum is achieved. By using a cleaning brush, the bristles flex to clean well beyond the tape path, and indeed the width of the brush can be wider than the tape path and therefore the deposits of dirt which build up on each side of the tape path are readily easily removed. Thus, it will be appreciated that the use of the brush 29 provides a considerable advantage over and above cleaning devices known heretofore.

Another important advantage of the invention is that by virtue of the fact that the cleaning fluid is applied by a felt wick type applicator, the fluid can be selectively applied to the tape and brush. Thus, a wet and dry clean action can be achieved. In other words, the portion of the tape initially moistened by the cleaner acts as a wet clean, and the unexposed tape, to which the cleaning fluid has not been applied, on passing over the components, then dries the components. This in many cases has not been possible to achieve in cleaning devices known heretofore, since in general, the cleaning fluid is applied by spraying it onto the tape, or drip feeding it on to the tape. Thus, excessive cleaning fluid is usually applied, and this soaks through a number of layers of tape on the spools. Thus, during the cleaning cycle only wet tape is drawn over the components to be cleaned.

It will be appreciated that while a particular construction of housing has been described, any other suitable construction could be provided without departing from the scope of the invention. In fact, in certain cases, it is envisaged that the lid may be dispensed with altogther, as indeed may the side walls be. Alternatively, the side walls may extend completely around the two sides and back of the housing, and may close the back and sides, if desired. Similarly, other constructions of spool arrangements could be used.

It is envisaged in certain cases that instead of the cleaning means for cleaning the drum being provided by a brush, it could be provided by any other cleaning member, such as, for example, a felt cleaning member, or a cleaning pad or the like. Similarly, cleaning members other than a brush and a felt cleaning member could be use for cleaning the capstan and pinch roller. Indeed, if desired, the capstan and pinch roller cleaning mechanism may be dispersed with.

While a particular arrangement of the cleaning tape has been described for moving the carrier member, and in turn the brush into engagement with the recording drum, any other suitable arrangement could be provided. Needles to say, other suitable constructions of carrier member could be used without departing from the scope of the invention. Indeed, while it is advantageous to have the cleaning member mounted on a flexible member, this is not essential to the invention, similarly, the return arm while being advantageous is not essential to the invention. It is also envisaged that instead of the carrier member being pivotally mounted in the housing, it could be slidably mounted, or mounted in any other way for movement to engage the video drum. Indeed, in certain cases, it is envisaged the cleaning means may not be movable, it may, in fact, be rigidly mounted to the housing. Further, the cleaning means for the drum, be it a brush or otherwise, could be moved by any means besides the tape. For example, it could be moved by a guide roller directly or by a guide roller bearing on the carrier member.

Further, it will be appreciated that while the housing has been described as having a top and base member, the housing could be provided with a base member only. In fact, in certain cases the base may be provided merely by a framework. Similarly, the lid may be dispensed with if desired.

Needless to say, where a lid is used other constructions of lid could be used without departing from the scope of the invention.

Similarly, other suitable rotatable mounting means for rotatably mounting the spools in the housing could be provided without departing from the scope of the invention. Similarly, other spools could be used.

In another case, it is envisaged that the cleaning means for the drum could be moved outwardly by having the cleaning tape bearing directly on the brush member.

It is also envisaged in certain cases that a cleaning tape of any suitable material besides a fabric could be used.

Needless to say, while the cleaning device has been described as being constructed of injection moulded plastics material, it could be constructed of any other suitable material, and could be manufactured by any other process as desired, for example, it could be fabricated, machined, or the like.

It will also be appreciated that in certain cases, the brush or any other cleaning means, and indeed the carrier member may be dispensed with. In which case, a bearing member would be provided in or adjacent the housing or base member, about which the tape would pass between, touching the arcuate portions on opposite sides of the drum.

I claim:

1. A cleaning device for cleaning the operating components of a playing and/or recording video unit, where the video unit comprises a receiving area for receiving a video tape cassette, and a recording head mounted in a rotating drum in the cassette receiving area for recording onto or playing from the tape, guide means to engage the tape of the tape cassette for moving the tape outwardly of the cassette to the drum, and a capstan and pinch roller assembly in the receiving area to engage the tape as it passes onto or from a spool of the cassette, the cleaning device comprising
   a pair of spools rotatable in the base member, and in use, operably engagable with spindles of the video unit,
   a cleaning tape wound on the spools, and
   a bearing member mounted on the base member which, in use, is spaced apart from the drum and intermediate the guide means on each side of the drum, so that, in use, the cleaning tape on passing over one guide means passes over a first arcuate portion of the drum, and then passes over the bearing member, before passing over a second arcuate portion of the drum on the opposite side of the drum to the first arcuate portion.

2. A cleaning device as claimed in claim 1 in which the bearing member is provided by an upstanding member extending from the base member, and having a bearing surface thereon, over which the cleaning tape passes.

3. A cleaning device for cleaning the operating components of a playing and/or recording video unit, where the video unit comprises a receiving area for receiving a video tape cassette, a recording and/or playing head mounted in a rotating drum (2) in the cassette receiving area for recording onto and/or playing from the tape, guide means (5-9) to engage the tape of a tape cassette for moving the tape outwardly of the cassette to the drum, and a capstan and pinch roller assembly (11,12) in the receiving area to engage the tape as it passes onto or from a spool of the cassette, the cleaning device comprising:
   a base member (16) to engage the cassette receiving area,
   a carrier member (28) movably mounted on the base member,
   cleaning means (29) mounted on the carrier member for engaging the drum,
   a pair of spools (24,25) rotatable in the base member, and in use, operably engagable with a drive spindle of the video unit, and
   a tape (26) wound onto the spools and extending from one to the other, the tape being in engagement with the carrier member, so that, in use, on movement of the tape to engage the drum, the carrier member is moved relative to the base member to move the cleaning means into engagement with the drum.

4. A cleaning device as claimed in claim 3 in which the carrier member is pivotally mounted on the base member 42, and comprises a bearing member to slidably engage the tape.

5. A cleaning device as claimed in claim 4 in which the bearing member of the carrier member is positioned in the base member so that, in use, the bearing member is spaced apart from the drum and intermediate the guide means on each side of the drum, so that the tape, in use, on passing over one guide means passes over a first arcuate portion of the drum and then passes over the bearing member before passing over a second arcuate portion of the drum on the opposite side of the drum to the first arcuate portion.

6. A cleaning device as claimed in claim 4 in which a top member spaced apart from the base member is provided, the carrier member being mounted between the top and base members, and a stop means being provided on the top member to engage the bearing member to limit outward movement of the carrier member.

7. A cleaning device as claimed in claim 3 in which the cleaning means is mounted on a flexible arm (44) extending from the carrier member.

8. A cleaning device as claimed in claim 3 in which a portion of the carrier member is adapted to engage a guide means of the video unit, so that on return of the tape to the cleaning device, the carrier member is moved inwardly of the base, said portion of the carrier member being bevelled to prevent said guide means engaging behind the carrier member should the carrier member be outwardly disposed of the base during loading of the cleaning device into the video unit.

9. A cleaning device as claimed in claim 3 in which the cleaning means is provided by a brush member.

10. A cleaning device as claimed in claim 3 in which a cleaning member is mounted on the base member to clean the capstan and pinch roller, the cleaning member being outwardly directed from the base member, and positioned so that, in use, as a guide means of the video unit is pivoted to move the tape outwardly of the cleaning device, the guide means wipes across the cleaning member with cleaning engagement.

11. A cleaning device as claimed in claim 3 in which the tape is of fabric material.

12. A cleaning device as claimed in claim 3 in which the tape is a cleaning tape.

13. A cleaning device for cleaning the operating components of a playing and/or recording video unit, where the video unit comprises a receiving area for receiving a video tape cassette, a recording and/or playing head mounted in a rotating drum in the cassette receiving area for recording onto and/or playing from the tape, guide means to engage the tape of a tape cassette for moving the tape outwardly of the cassette to the drum, and a capstan and pinch roller assembly in the receiving area to engage the tape as it passes onto or from a spool of the cassette, the cleaning device comprising:
- a base member to engage the cassette receiving area,
- a carrier member movably mounted on the base member,
- cleaning means mounted on the carrier member for engaging the drum,
- at least one spool rotatable in the base member, and in use, operably engagable with a drive spindle of the video unit, and
- connecting means operatively connected to the carrier member and spool so that on rotation of the spool, the carrier member is moved into engagement with the drum.

14. A cleaning device as claimed in claim 13 in which the connecting means is provided by a tape wound onto the spool.

15. A cleaning device for cleaning the operating components of a playing and/or recording video unit, where the video unit comprises a receiving area for receiving the video tape cassette, a recording and/or playing head mounted in a rotating drum in the cassette receiving area for recording onto and/or playing from the tape, guide means to engage the tape of a tape cassette for moving the tape outwardly of the cassette to the drum, and a capstan and pinch roller assembly in the receiving area to engage the tape as it passes onto or from a spool of the cassette, the cleaning device comprising:
- a base member to engage the cassette receiving area,
- a carrier member movably mounted on the base member,
- cleaning means mounted on the carrier member for engaging the drum, and
- drive means connecting to the carrier member to move the cleaning means, in use, into engagement with the drum, the drive means being powered independently of the video unit.

16. A cleaning device for cleaning the operating components of a playing and/or recording video unit, where the video unit comprises a receiving area for receiving a video tape cassette, a recording and/or playing head mounted in a rotating drum in the cassette receiving area for recording onto and/or playing from the tape, guide means to engage the tape of a tape cassette for moving the tape outwardly of the cassette to the drum, and a capstan and pinch roller assembly in the receiving area to engage the tape as it passes onto or from a spool of the cassette, the cleaning device comprising:
- a base member to engage the cassette receiving area,
- a carrier member movably mounted on the base member,
- cleaning means mounted on the carrier member for engaging the drum, and
- connecting means connected to the carrier member and in use operatively engaged with the capstan pinch roller assembly, so that on rotation of the capstan pinch roller assembly the cleaning means is moved into engagement with the drum.

* * * * *